United States Patent

[11] 3,572,453

| [72] | Inventor | Joseph R. Hannum |
| --- | --- | --- |
| | | Norristown, Pa. |
| [21] | Appl. No. | 779,835 |
| [22] | Filed | Nov. 29, 1968 |
| [45] | Patented | Mar. 30, 1971 |
| [73] | Assignee | The Budd Company |
| | | Philadelphia, Pa. |

[54] AUTOMATIC TWO STAGE WEIGHING AND PREFORMING OF EQUIPMENT
5 Claims, 1 Drawing Fig.

[52] U.S. Cl. .................................................. 177/123, 222/200
[51] Int. Cl. ........................................................ G01g 13/02
[50] Field of Search ............................................ 177/114, 119, 122, 123; 141/128, (Inquired), 360; 222/200, (Inquired), 310

[56] References Cited
UNITED STATES PATENTS

| 3,134,449 | 5/1964 | Coffaro et al. | 177/123X |
| 3,135,343 | 6/1964 | Stambera | 177/122X |
| 3,209,844 | 10/1965 | Stambera et al. | 177/123X |
| 3,404,742 | 10/1968 | Bonnerie | 177/122X |

FOREIGN PATENTS

| 654,056 | 6/1951 | Great Britain | 177/123 |

Primary Examiner—Richard B. Wilkinson
Assistant Examiner—George H. Miller, Jr.
Attorneys—Thomas I. Davenport, Edward M. Farrell, Alford L. Trueax, Jr. and William R. Nolte ABSTRACT: A system for weighing and preforming material includes first and second conveyors for conveying material to a weighing device. Means are associated with one of the conveyors to separate fibers of the material to permit fine weighing of the material prior to preforming it into an article.

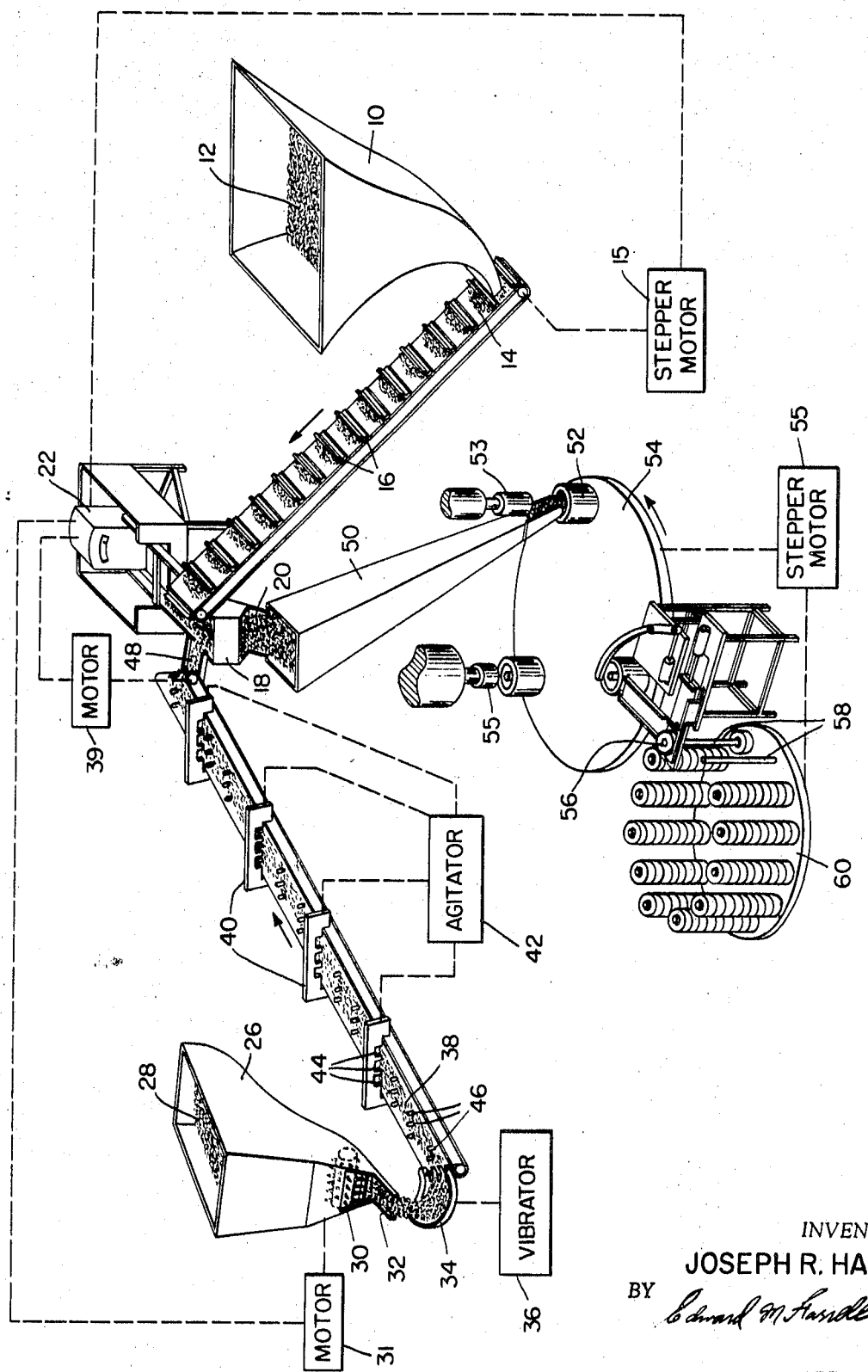

AUTOMATIC TWO STAGE WEIGHING AND PREFORMING OF EQUIPMENT

In the manufacture of certain articles, for example gear blanks, a web portion is generally formed of macerated resin impregnated material with the rim portion being formed of laminated resin impregnated fibrous material. A metal hub member is generally centrally located of the web portion for mounting the gear onto a rotatable member such as a shaft. A type of material and apparatus for manufacturing articles to which the present invention is related is described generally in U.S. Pats. to Benge, No. 2,521,625 and Benge, No. 2,555,109. These patents generally describe the formation of articles, such as gears which may be used in automobiles and the like.

While the preforming operation may generally be made automatic, certain inherent problems relating to the material used have hampered the development of a fully automatic system. These problems have generally involved dispensing material to the preform mold in precise weighted portions. Maintaining the precise weight is important to maintain constant density and dimensional stability in the final formed article. Too light or too heavy a weight tends to cause problems when the part is put into operation.

One of the main reasons why systems involving the manufacture of many molded fiber parts has not been made fully automatic relates to the thermoset macerated molding compound used. This material generally involves fibers which tend to stick together. Because of this, when the material is weighted it is generally difficult to attain fine precision weighing as the material is being dispensed because the fibers cling together to form particles that are generally too heavy to permit precise final weights.

In separating the fibers of the material, it is important that the lengths of the fibers be maintained for impact strength. Effects to solve the problem relating to separating the fibers which are stuck together to permit precise weighing have involved persons manually separating the fibers with their fingers. Also, pelletizing of the material has been used. Both of these methods are expensive. In addition, the use of pellets reduces the impact strength of the final articles formed. The reason for this is that pelletizing tends to reduce the lengths of the fibers which, in turn, reduces the impact strength of the molded parts.

It is an object of this invention to provide an improved automatic weighing system for macerated material in which the fibers or particles tend to stick together.

It is a further object of this invention to provide an improved means for handling and weighing thermoset macerated molding compounds.

It is still a further object of this invention to provide improved means for separating the fibers of material which tend to stick together.

It is still a further object of this invention to provide an improved system for weighing and preforming fiber articles from macerated material.

In accordance with the present invention, a system for weighing and preforming articles, such as gears, from macerated material includes a weighing device. A pair of conveyors convey the material to be weighed. The first conveyor delivers material for coarse weighing to bring the weight slightly below the final weight desired. When the material to be weighed is close to the desired weight, material from the second conveyor which includes separated fibers of the same material is then conveyed to the weighing machine for final weighing. When the precise desired weight is reached, means are operated to permit the weighed material to be conveyed to a preforming mold.

Other objects and advantages of the present invention will be apparent and suggest themselves to those skilled in the field, from a reading of the following specification and claims, in conjunction with the accompanying drawing, in which the sole FIGURE of the drawing illustrates schematically a weighing and preforming system, in accordance with the present invention.

In describing the subject invention, various conventional devices and means are not illustrated in detail for purposes of clarity. Such conventional devices are well known to those skilled in the field. The main features of the subject invention resides in the weighing of material in two separate steps. The second step involves weighing of material after the fibers have been separated.

Referring to the drawing, a funnel housing 10 includes macerated material 12. The material is fed to a conveyor belt 14. The conveyor belt 14 may be moved continuously or in steps by means of a motor 15. A plurality of flat partition elements 16 are secured to the conveyor belt to permit the material to be conveyed upwardly at an angle.

The material from the conveyor belt 14 is delivered to a housing 18 having an open top and a bottom door 20 which may be selectively opened and closed as correct portions of weighted material are dispensed into the housing. The housing 18 forms an integral part of the weighing means. A weigher and control mechanism 22 weighs the material in the housing 18 and actuates a mechanism to cause the door 20 to open when the correct weight is attained. The material from the conveyor belt 14 is used in connection with the coarse weighing. In other words, the material is weighed up to some predetermined level very close to but less than the precise weight desired. The weigher and control unit 22 includes various electronic control circuits to program various operations in the system at selected times. Such units are available commercially and form no part of the subject invention per se.

When the coarse weight is reached, the material from the conveyor belt 14 is no longer delivered to the housing 18 and the step involving the precise weighing operation takes place. The conveyor belt 14 may be stopped during the precise weighing operation. However, the system may be designed to be moved continuously with the material being delivered in predetermined portions with a time interval between each delivery. The conveyor belt 14 may be moved at a relatively fast rate.

A funnel housing 26 also includes macerated material 28. Because this material 28 is to be used in the final weighing operation, it is important that the fibers be separated because the nature of the material is such that the fibers tend to cling together.

The funnel housing 26 includes a toothed-drum 30 which is rotated by a motor 31 or other suitable means to draw out the material 28 and deliver it to a chute 32. The rate of speed of the member 30 may be controlled by signals from the weigher and control unit 22. An electric eye or other arrangement may be used to detect the flow of material at different points. The toothed-drum 30 assists in separating the fibers of the material as it is funnelled to the chute 32 without degrading or breaking up the fibers into smaller lengths, which ultimately would result in lowering the impact strength of the article formed. The material from the chute 32 is dropped by means of gravity onto a plate element 34. The plate element 34 may be vibrated up and down at a relatively high frequency by means of a vibrator 36.

The material from the plate 34 is dropped onto a second conveyor belt 38 which is suitably driven by a motor 39. The second conveyor is moved slowly relative to the conveyor belt 14. As the material is moved along on the conveyor belt 38, it is contacted by a plurality of separator elements 40. These elements are agitated or vibrated transverse to the direction of the conveyor belt 38 by means of an agitator or vibrator 42. The elements 40 include a plurality of openings 44 to permit passage of the material therethrough. The conveyor belt 38 also includes a plurality of pins or prongs 46 which aids in separating the fibers of the material on the conveyor belt. In some operations, it may be desirable to vibrate the conveyor 38 slightly during operation.

As the conveyor belt 38 moves and the material is subjected to the vibrating action and physical contact of the members 40, the fibers of the material separate and the bulk of material becomes less and less. At the end of the conveyor belt, the density of material is sufficiently low so that the separated fibers of material may be delivered to the housing 18 for fine weighing. The material 28 is passed off the conveyor belt 38 onto a chute 48 and is dropped into the housing 18. Means for vibrating the chute 48 may be provided.

The combined material from the conveyor belts 14 and 38 is then weighed by the weigher and control unit 22. When the precise desired weight is attained, the conveyor belt 38 may be stopped by means of a signal from the unit 22 inactivating the motor 39. The door 20 is then opened and the material from the conveyor belts 14 and 38 which has passed into the housing 18 is delivered through a conduit 50 to preform mold 52. The material is compacted within the mold 52 by a plunger 53 prior to being subject to high pressure and heat in a preform mold 52 at the next position. The stuffer operation may be designed to receive more than one load from the conduit 40. A plunger 55 is used to subject the material to high heat and pressure.

After the material has been delivered to the preforming unit 52, it is subjected to the various forming operations, such as those described in the aforementioned patents. Upon preforming a particular single gear blank, for example, a table 54 may be sequentially stepped a predetermined distance by means of a stepper motor 55. The formed article may be automatically transferred from the table onto a plurality of vertical elements 58 which are secured to the table 60. The table 60 may also be sequentially moved as each of the vertical elements 58 receives its maximum number of gear blanks.

The subject invention has provided means for automatically weighing and preforming fiber gear blanks or other articles where macerated material which tends to stick together is used as the forming material. This completely automated system is made possible as a result of the means employed for separating the macerated particles to permit fine weighing.

As mentioned, most of the means suggested in the automated system described are conventional in the art and therefore not shown for purposes of clarity. It is noted that one of the features of the subject invention involves conveying the material to a relatively high level so that the final weighted material may be applied to the preform mold by means of a gravity feed. This arrangement simplifies the overall system.

It is recognized that in separating the fibers on the conveyor belt 38 that some of the material will spill off the belt. Conventional means may be provided to return this material to the supply hopper.

In place of toothed driven wheels 30 for drawing the material from the hoppers motor-driven screws may be used to cause the material to be fed onto the conveyor belts without degrading or breaking up the fiber into smaller lengths.

It is noted that the material from the housing 28 until delivery to the preform molds is continuously agitated to first separate the fibers of the material and then keep them separated.

The rates at which the material is fed to both conveyor belts may be controlled by signals from the weigher and control unit 22 to control a screw motor or motor-driven toothed wheels, such as the toothed drum 32. The rates of feed to both conveyor belts would be different. For example, the belt 38 may be moved at one quarter the speed of the belt 14.

I claim:

1. A system for weighing material having particles which tend to stick together comprising: means for weighing, a first means for conveying material to said means for weighing, second means including a conveyor belt for conveying material to said means for weighing, vibratable means disposed transverse to the direction of movement of said conveyor belt to physically contact said material to provide frictional forces for separating the fibers of said material to permit fine weighing of said material.

2. The invention as set forth in claim 1 wherein said first means for conveying material comprises another movable conveyor belt having means associated therewith to permit material thereon to be subdivided into predetermined amounts for delivery to said means for weighing.

3. The invention as set forth in claim 2 wherein means are provided to selectively control the operations of the two conveyor belts associated with said first and second conveyor means and to deliver the weighed material to a utilization area when the precise weight of said material is attained.

4. The invention as set forth in claim 3 wherein said utilization area includes a mold for preforming an article.

5. The invention as set forth in claim 4 wherein the rates of speed of said two conveyor belts are different.